United States Patent
Wu

(10) Patent No.: US 9,894,030 B2
(45) Date of Patent: Feb. 13, 2018

(54) METHOD, DEVICE, COMPUTER STORAGE MEDIUM, AND APPARATUS FOR PROVIDING CANDIDATE WORDS

(71) Applicant: Baidu Online Network Technology (Beijing) Co., Ltd., Beijing (CN)

(72) Inventor: Xianchao Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 154 days.

(21) Appl. No.: 14/954,232

(22) Filed: Nov. 30, 2015

(65) Prior Publication Data

US 2016/0094511 A1    Mar. 31, 2016

Related U.S. Application Data

(63) Continuation of application No. PCT/CN2014/079376, filed on Jun. 6, 2014.

(30) Foreign Application Priority Data

Jul. 29, 2013    (CN) .......................... 2013 1 0322607

(51) Int. Cl.
*G06F 15/16* (2006.01)
*H04L 12/58* (2006.01)
(Continued)

(52) U.S. Cl.
CPC .............. *H04L 51/38* (2013.01); *G06F 3/048* (2013.01); *G06F 17/274* (2013.01); *G06Q 10/10* (2013.01);
(Continued)

(58) Field of Classification Search
CPC ....... H04L 51/04; H04L 51/32; G06F 17/276; G06F 3/0237; G06N 99/005
See application file for complete search history.

(56) References Cited

U.S. PATENT DOCUMENTS

| 8,196,112 B1 * | 6/2012 | Cansizlar ............ G06F 11/3672 717/116 |
| 2002/0059056 A1 * | 5/2002 | Appleby .................. G09B 5/14 704/4 |

(Continued)

FOREIGN PATENT DOCUMENTS

| CN | 101697098 A | 4/2010 |
| CN | 101291302 B | 8/2011 |

(Continued)

*Primary Examiner* — Hieu Hoang
(74) *Attorney, Agent, or Firm* — Seed IP Law Group LLP

(57) ABSTRACT

A method, device, computer storage medium, and apparatus for providing candidate words. The method comprises steps of: detecting user input; determining whether the current application environment is an information exchange application if user input is detected; determining an identifier of the communication counterpart in communication with the user if it is determined that the current application environment is an information exchange application; determining, based on the determined identifier of the communication counterpart, the social relationship between the user and the communication counterpart according to a social relationship automatic determination model, which is a model for determining the social relationship between the user and the communication counterpart; determining, based on a social relationship correction mapping table, whether the user input matches the determined social relationship, wherein the social relationship correction mapping table provides, based on the determined social relationship, correction candidate words corresponding to the social relationship; providing, based on the social relationship correction mapping table, correction candidates the determined social relationship if it is determined that the user input does not match the social relationship.

18 Claims, 5 Drawing Sheets

(51) Int. Cl.
- *G06F 3/048* (2013.01)
- *G06Q 10/10* (2012.01)
- *G06Q 50/00* (2012.01)
- *G06F 17/27* (2006.01)

(52) U.S. Cl.
CPC .............. *G06Q 50/01* (2013.01); *H04L 51/04* (2013.01); *H04L 51/32* (2013.01)

(56) References Cited

U.S. PATENT DOCUMENTS

| | | | |
|---|---|---|---|
| 2003/0131050 A1* | 7/2003 | Vincent | H04L 51/04 709/203 |
| 2004/0260533 A1* | 12/2004 | Wakita | G06F 17/2795 704/4 |
| 2005/0075877 A1* | 4/2005 | Minamino | G10L 15/083 704/254 |
| 2012/0284015 A1* | 11/2012 | Drewes | G06F 17/2854 704/3 |
| 2013/0047099 A1* | 2/2013 | Markman | G06F 17/274 715/758 |
| 2013/0073629 A1 | 3/2013 | Su et al. | |
| 2013/0154981 A1 | 6/2013 | Park et al. | |
| 2014/0278361 A1* | 9/2014 | Pak | G06F 17/273 704/9 |

FOREIGN PATENT DOCUMENTS

| | | |
|---|---|---|
| CN | 102263799 A | 11/2011 |
| CN | 103399906 A | 11/2013 |

\* cited by examiner

METHOD, DEVICE, COMPUTER STORAGE MEDIUM, AND APPARATUS FOR PROVIDING CANDIDATE WORDS

This application claims priority of the Chinese patent application with a filing date of Jul. 29, 2013, an Application No. of 201310322607.7, and a title of "Method and device for providing candidate words during input based on social relationship".

FIELD

The present disclosure relates to a method, device, computer storage medium, and apparatus for providing candidate words.

BACKGROUND

Nowadays, with the development of communication technology, there emerge more and more input systems applied to various communication terminals (such as mobile communication terminals, personal digital assistants (PDA), smart phones, desktop computers, notebook computers, and tablet PCs, which are based on communication protocols for various communication systems). However, current input systems share the following disadvantages: 1. they are insensitive to the identity of the communication counterpart in a text chat and insensitive to the social relationship between the user and the communication counterpart; 2. due to the insensitivity to the social relationship, it is difficult for the input systems to properly choose among everyday casual language, self-effacing language, and respect language for respective words.

For example, in a Chinese input method, for a female user, when referring to "you", she needs to use different words for different persons. When the counterpart is the female's husband, she usually uses the Chinese word for "husband"; when the counterpart is a business partner, usually the Chinese word for "your honor" or "our dear customer" shall be used; when the counterpart is the female's father, she usually uses the Chinese word for "your honor" or "Dad". Furthermore, in Chinese, to show respect to the counterpart, one usually uses respect language and self-effacing language, which is directly reflected in the phrasing and grammar. For example, when expressing "I'm sorry", the user of an input method generally will dynamically select his wording based on the social relationship between himself and the counterpart. As an example, when the counterpart is a subordinate or is younger, one usually says "sorry", indicating a relatively light degree of apology; when the counterpart is one's colleague, he usually uses "I am sorry", indicating a normal degree of apology; when the counterpart is one's elder, teacher, or commercial customer, he usually uses the very formal expression "I am very sorry", indicating a more sincere and higher degree of apology. In this way, when the communication counterpart is a user's elder, teacher, or business customer, in the case the user inputs the text "sorry", it will better serve the purpose of the communication and correct the user's improper wording if the input method displays a prompt to the user saying that it is better to use "I am very sorry" or an even more respectable term. Accordingly, it is necessary to have an input method that can provide candidate words suitable for the social relationship between the user and the communication counterpart.

SUMMARY

According to an embodiment, there are provided methods and devices for providing candidate words during input, based on the social relationship. The methods and devices can determine the social relationship between the user and the communication counterpart based on the chat history between the user and the communication counterpart stored in the information exchange application, and thus provide candidate words suitable for the social relationship.

According to an embodiment, there is provided a method for providing candidate words based on social relationship during input, comprising steps of: detecting user input; determining whether the current application environment is an information exchange application if user input is detected; determining an identifier of the communication counterpart in communication with the user if it is determined that the current application environment is an information exchange application; determining, based on the determined identifier of the communication counterpart, a social relationship between the user and the communication counterpart according to a social relationship automatic determination model, which is a model for determining a social relationship between the user and the communication counterpart; determining, based on a social relationship correction mapping table, whether the user input matches the determined social relationship, wherein the social relationship correction mapping table provides, based on the determined social relationship, correction candidate words corresponding to the social relationship; providing, based on the social relationship correction mapping table, correction candidate words that match the determined social relationship if it is determined that the user input does not match the social relationship.

The step of determining whether the current application environment is an information exchange application may include: determining whether the current application environment is an information exchange application through calling determined parameters of the current application environment, which may be predetermined.

The step of determining an identifier of the communication counterpart in communication with the user may include: determining the identifier of the communication counterpart by extracting, in the information exchange application, information associated with the identifier of the communication counterpart.

The method may further comprise a step of establishing, in advance, a social relationship automatic determination model, wherein the step of establishing a social relationship automatic determination model comprises: marking the social relationship between the user and the communication counterpart, based on the chat history between the user and the communication counterpart stored in the information exchange application; carrying out a feature extraction on the chat history with an n-element language model; using the chat history after the feature extraction and the marked social relationship as training data to train, based on a classification algorithm, the social relationship automatic determination model, wherein the social relationship automatic determination model includes a chat history element and a social relationship element.

The method may further comprise a step of establishing, in advance, a social relationship correction mapping table, wherein the step of establishing a social relationship correction mapping table comprises: establishing a language mapping table through manual construction and/or an automatic mining algorithm, wherein the language mapping table is a mapping table for everyday casual language forms, self-effacing language forms, and respect language forms for respective words; establishing a social relationship correction mapping table, based on the established language mapping table and the established social relationship automatic determination model, wherein the social relationship correction mapping table includes a social relationship element, a user input element, and a correction candidate word element.

The automatic mining algorithm may be a word alignment model algorithm of an expectation-maximization algorithm.

The step of establishing, in advance, a social relationship correction mapping table may further comprise: updating the social relationship correction mapping table based on a user's selection of provided candidate words.

The social relationship may include: same-generation/level relationship, different-generation relationship, leader-member relationship, and business relationship.

The forms of the candidate words associated with the social relationship may include self-effacing language forms, respect language forms, and everyday casual language forms.

The information change application may include real-time communication service, social network based chat/message service, and short message service.

In an embodiment, there is provided a device for providing candidate words based on social relationship during input, comprising steps of: an input detection unit, which detects user input; a first determining unit, which determines whether the current application environment is an information exchange application; a second determining unit, wherein, when the first determination unit determines that the current application environment is an information exchange application, the second determining unit determines an identifier of the communication counterpart in communication with the user; a social relationship determination unit, which, based on the determined identifier of the communication counterpart, determines the social relationship between the user and the communication counterpart according to a social relationship automatic determination model, wherein the social relationship automatic determination model is a model for determining the social relationship between the user and the communication counterpart; a matching determination unit, which, based on a social relationship correction mapping table, determines whether the user input matches the determined social relationship, wherein the social relationship correction mapping table provides, based on the social relationship, correction candidate words corresponding to the established social relationship; a correction candidate word providing unit, wherein, when the user input does not match the social relationship, the correction candidate word providing unit provides, based on the social relationship correction mapping table, correction candidate words that match the determined social relationship.

The first determining unit may be configured to determine whether the current application environment is an information exchange application through calling determined parameters of the current application environment, which may be predetermined.

The second determining unit may be configured to determine the identifier of the communication counterpart by extracting, in the information exchange application, information associated with the identifier of the communication counterpart.

The device may further comprise a social relationship automatic determination model establishing unit, wherein the social relationship automatic determination model establishing unit comprises: a social relationship marking unit, which marks the social relationship between the user and the communication counterpart, based on the chat history between the user and the communication counterpart stored in the information exchange application; a feature extraction unit, which carries out feature extraction on the chat history with a n-element language model; and a social relationship automatic determination model training unit, which uses the chat history after the feature extraction and the marked social relationship as training data to train, based on a classification algorithm, the social relationship automatic determination model, wherein the social relationship automatic determination model includes a chat history element and a social relationship element.

The device may further comprise a social relationship correction mapping table establishing unit, wherein the social relationship correction mapping table establishing unit comprises: a language mapping table establishing unit, which establishes a language mapping table through manual construction and/or an automatic mining algorithm, wherein the language mapping table is a mapping table for everyday casual language forms, self-effacing language forms, and respect language forms for respective words; a social relationship correction mapping table establisher, which establishes a social relationship correction mapping table, based on the established language mapping table and the established social relationship automatic determination model, wherein the social relationship correction mapping table includes a social relationship element, a user input element, and a correction candidate word element.

The automatic mining algorithm may be a word alignment model algorithm of an expectation-maximization algorithm.

The social relationship correction mapping table establishing unit may further comprise: an update unit to update the social relationship correction mapping table based on a user's selection of provided candidate words.

BRIEF DESCRIPTION OF THE DRAWINGS

With the following description of the drawings, the above and other features of the present disclosure will become more apparent, wherein.

DETAILED DESCRIPTION OF EMBODIMENTS

The following description provided with references to the drawings is intended to deliver comprehensive understanding of example embodiments. The description includes various specific details to assist understanding; these details however should be regarded as merely exemplary. Accordingly, one of ordinary skill in the art will recognize that the embodiments disclosed herein can be subject to various changes and corrections without departing from the scope and spirit of this disclosure. In addition, for the sake of clarity and conciseness, description of well-known functions and structures may be omitted.

Figure 1:
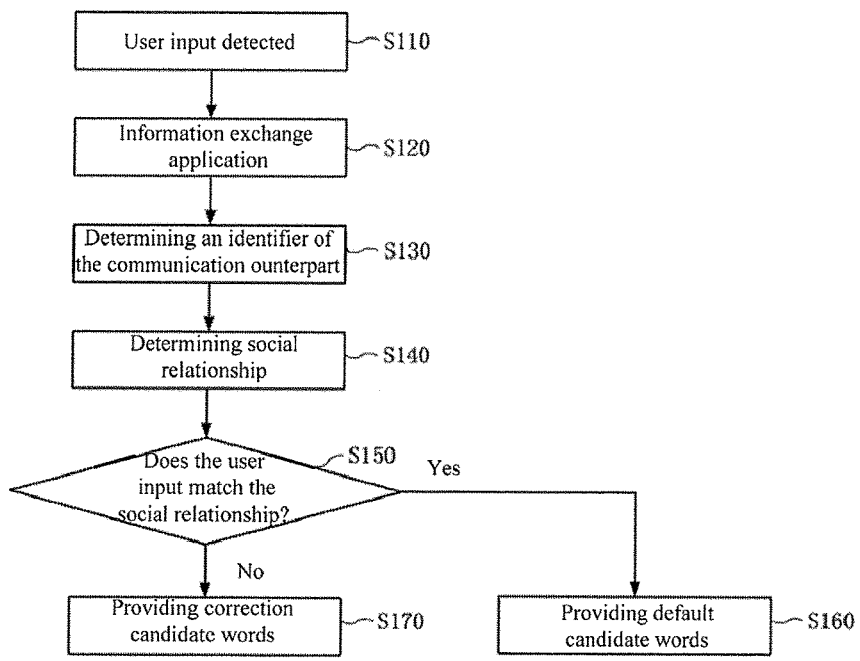
FIG. 1 shows a flow chart of a method for providing candidate words based on social relationship during input according to an embodiment.

FIG. 1 shows a flow chart of a method for providing candidate words based on social relationship during input according to an embodiment.

Referring to FIG. 1, in step S110 whether a user performs input operation via an input application is detected. If it is detected that the user does perform input operation via an input application, step S120 determines whether the current application environment is an information exchange application. For example, it can determine whether the current application environment is an information exchange application through calling determined parameters (which may be predetermined) of the current application environment, the determined parameters indicate the application identifier (ID) corresponding to the current application environment. The information exchange application may include various information exchange application for text messages used in various communication terminals (such as mobile communication terminals, personal digital assistants (PDA), smart phones, desktop computers, notebook computers, and tablet PCs, which are based on communication protocols for various communication systems), such as a variety of real-time communication services (such as line, QQ, wechat, baiduHi), social network based chat/message services (such as Facebook and Twitter), and short message services in mobile terminals. The example embodiments however are not limited to this, information exchange may also include other applications used for information exchange known to one of ordinary skills in the art.

If step S120 determines that the current application environment is an information exchange application, an identifier of the communication counterpart in communication with the user is determined in step S130. For example, one can determine the identifier of the communication counterpart by extracting, in the information exchange application, information associated with the identifier of the communication counterpart.

Thereafter, in step S140, based on the determined identifier of the communication counterpart, a social relationship between the user and the communication counterpart is determined according to a social relationship automatic determination model, which can be a model for determining a social relationship between the user and the communication counterpart. The social relationship between the user and the communication counterpart may include so-called same-generation (or equal-status) relationship where the user and the counterpart are in the same generation (or are in equal status), different-generation relationship where the user and the counterpart belong to different generations, leader-member relationship, and business relationship. A detailed description of an embodiment of the process for establishing the social relationship automatic determination model is given later with references to FIG. 2.

In step S150, it is determined, based on a social relationship correction mapping table, whether the user input matches the determined social relationship. Herein, the social relationship correction mapping table may provide correction candidate words corresponding to the social relationship based on the social relationship determined in step S140. As an example, if the social relationship between the user and the communication counterpart is the same-generation (or equal-status) relationship, the corresponding language used in the dialogue can take the form of everyday casual language; if the social relationship between the user and the communication counterpart is the different-generation (or leader-member) relationship or the business relationship, the corresponding language used in the dialogue can be self-effacing language directed at the speaker himself or respect language directed at the counterpart speaker. A detailed description of an embodiment of the process for establishing a social relationship correction mapping table is given later with references to FIG. 3.

If it is determined in step S150 that the user input matches the social relationship, step S160 provides default candidate words, e.g., candidate words corresponding to the user input. If it is determined in step S150 that the user input does not match the social relationship, step S170 provides, based on the social relationship correction mapping table, correction candidate words that match the determined social relationship.

Figure 2:
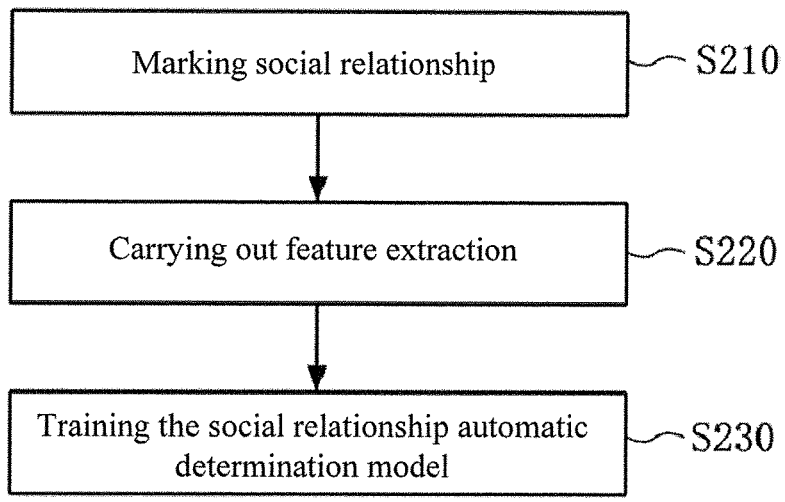
FIG. 2 shows a flowchart of the process for establishing a social relationship automatic determination model according to an embodiment.

FIG. 2 shows a flowchart of the process for establishing a social relationship automatic determination model according to an embodiment.

Referring to FIG. 2, in step S210, the social relationship between the user and the communication counterpart is marked, based on the communication history (e.g., the chat history) between the user and the communication counterpart. Herein, the social relationship can be marked manually. The chat history may include the chat history stored in the aforementioned information exchange application.

In step S220, a feature extraction is carried out on the chat history with an n-element language model. Thereafter, in step S230, the chat history after the feature extraction and the marked social relationship are used as training data to train, based on a classification algorithm, the social relationship automatic determination model. The classification algorithm may be a support vector machine (SVM) classification algorithm, a Naive Bayes classification algorithm, or any other algorithm known to one skilled in the art. The social relationship automatic determination model may include a chat history element and a social relationship element. For instance, the social relationship between the user and the communication counterpart can be determined through comparison of the chat history stored in the information exchange application with the chat history element in the social relationship automatic determination model.

Figure 3:
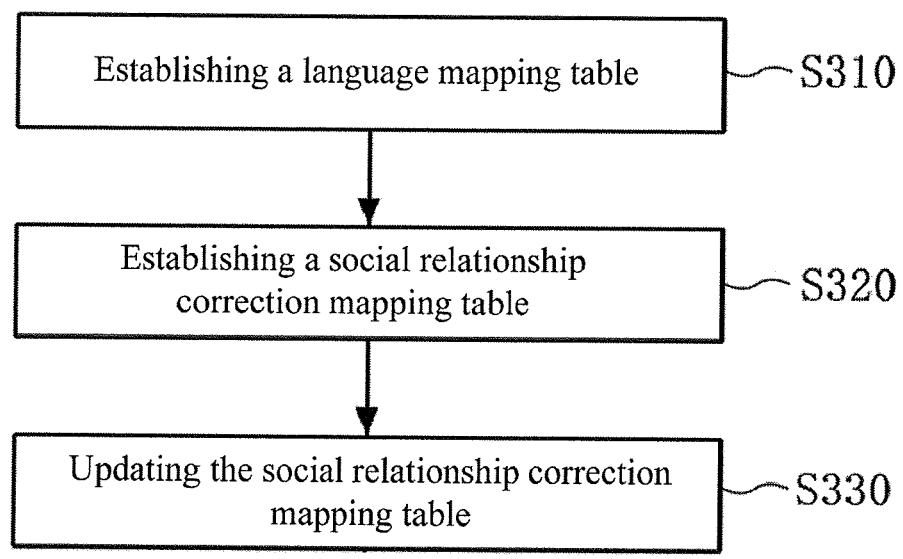
FIG. 3 shows a flowchart of the process for establishing a social relationship correction mapping table according to an embodiment.

FIG. 3 shows a flowchart of the process for establishing a social relationship correction mapping table according to an embodiment.

Referring to FIG. 3, in step S310, a language mapping table is established through manual construction and/or an automatic mining algorithm (for example, a word alignment model algorithm of an expectation-maximization algorithm). The language mapping table is a mapping table for everyday casual language forms, self-effacing language forms, and respect language forms for respective words.

Thereafter, in step S320, a social relationship correction mapping table is established, based on the language mapping table established in step S310 and the social relationship automatic determination model established in FIG. 2. The social relationship correction mapping table includes a social relationship element, a user input element, and a correction candidate word element. For instance, the social relationship correction mapping table can have the form of <social relationship, user input, correction candidate word>. As an example, after determination of the social relationship between the user and the communication counterpart, it is determined whether the user input matches corresponding correction candidate words. If the user input does not match the correction candidate words, the correction candidate words are provided to the user; if the user input does match the correction candidate words, candidate words corresponding to the user input are provided to the user.

In an embodiment, the process for establishing a social relationship correction mapping table may also comprise a step S330, in which the social relationship correction mapping table is updated based on a user's selection of candidate words provided in the input method. For example, when the number of times for a user to select a particular candidate word reaches a determined threshold number (which may be predetermined), the social relationship correction mapping table can be changed based on the particular candidate word.

Figure 4:
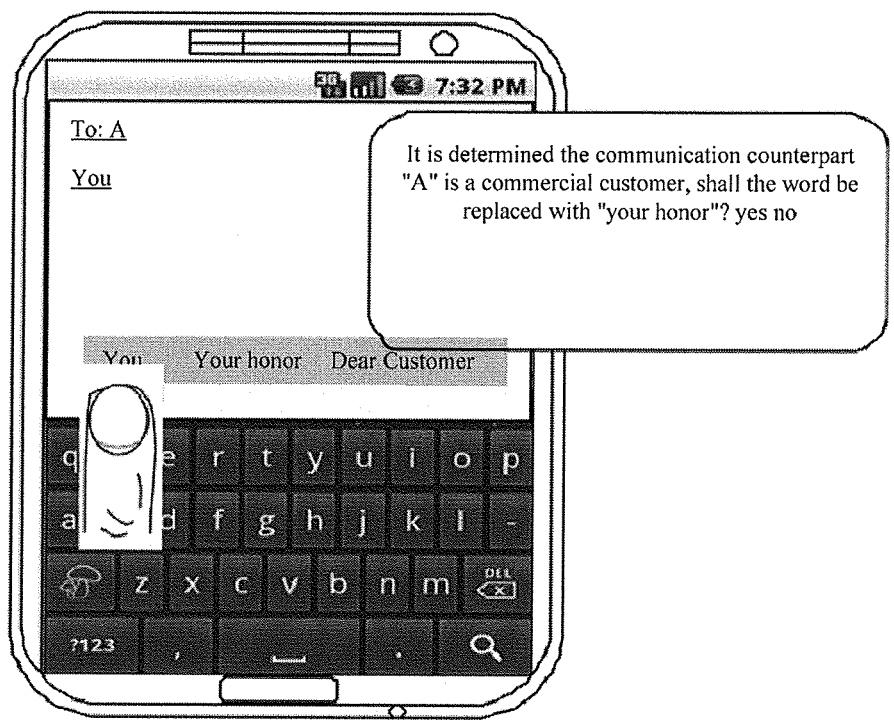
FIG. 4 shows the diagram of an example of providing candidate words to a user through a method for providing candidate words based on social relationship.

FIG. 4 shows the diagram of an example of providing candidate words to a user through a method for providing candidate words based on the social relationship.

Referring to FIG. 4, when a user inputs a Chinese word of "you" through an input application, because it is determined the communication counterpart "A" is a commercial customer, the candidate words "your honor" and "dear customer" are provided in the candidate word options in the input application. Furthermore, a popup box can be displayed on the mobile terminal's display, prompting whether the word "you" shall be replaced with the word "your honor".

To one of ordinary skills in the art, although English translations of Chinese words are used herein as an example for description, embodiments are not limited to Chinese or English. Embodiments can be applied to other languages, such as other languages with different forms of language (for example, self-effacing language forms, respect language forms, everyday casual language forms), such as Japanese and Korean.

Figure 5:
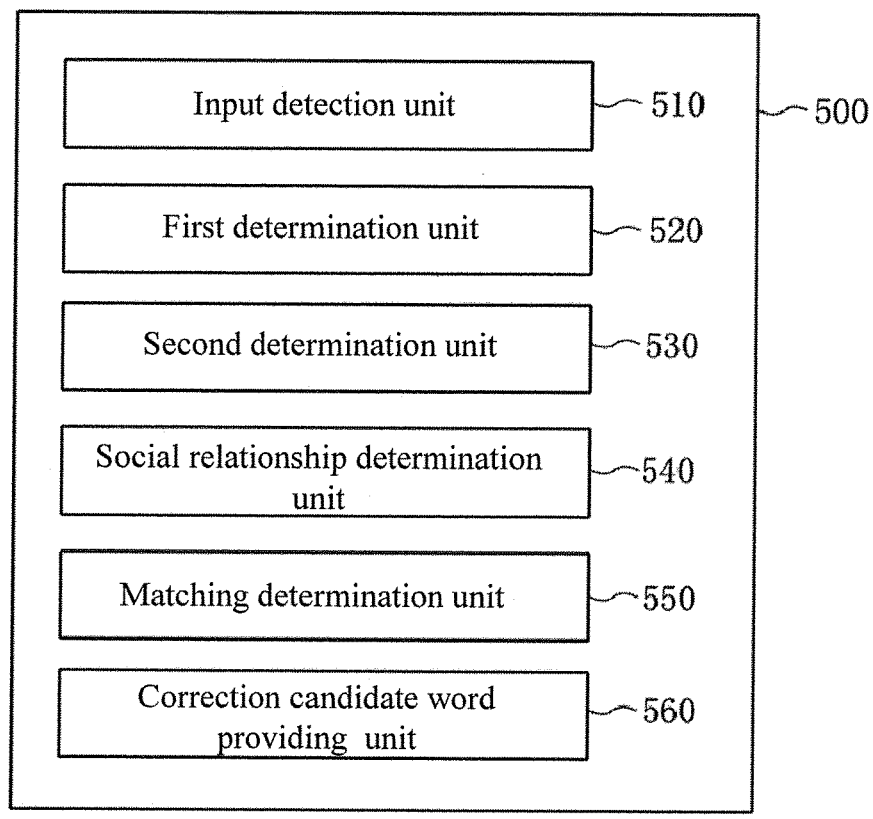
FIG. 5 shows the block diagram of a device for providing candidate words based on social relationship during input according to an embodiment.

FIG. 5 shows the block diagram of a device 500 for providing candidate words based on social relationship during input according to an embodiment.

Referring to FIG. 5, the device 500 for providing candidate words based on the social relationship comprises: an input detection unit 510, which detects user input; a first determining unit 520, which determines whether the current application environment is an information exchange application; a second determining unit 530, wherein, when the first determination unit 520 determines that the current application environment is an information exchange application, the second determining unit 530 determines an identifier of the communication counterpart in communication with the user; a social relationship determination unit 540, which, based on the determined identifier of the communication counterpart, determines a social relationship between the user and the communication counterpart according to a social relationship automatic determination model, wherein the social relationship automatic determination model is a model for determining a social relationship between the user and the communication counterpart; a matching determination unit 550, which, based on a social relationship correction mapping table, determines whether the user input matches the determined social relationship, wherein the social relationship correction mapping table provides correction candidate words corresponding to the social relationship based on the established social relationship; a correction candidate word providing unit 560, wherein, when the user input does not match the social relationship, the correction candidate word providing unit 560 provides, based on the social relationship correction mapping table, correction candidate words that match the determined social relationship.

Figure 6:
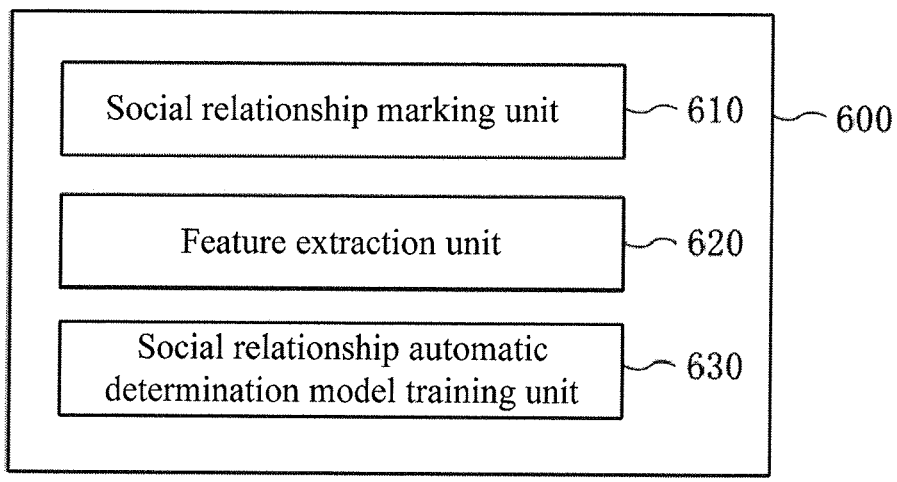
FIG. 6 shows the block diagram of a social relationship automatic determination model establishing unit according to an embodiment.

FIG. 6 shows the block diagram of a social relationship automatic determination model establishing unit 600 according to an embodiment.

Referring to FIG. 6, the social relationship automatic determination model establishing unit 600 comprises: a social relationship marking unit 610, which marks the social relationship between the user and the communication counterpart, based on the chat history between the user and the communication counterpart stored in the information exchange application; a feature extraction unit 620, which carries out feature extraction on the chat history with a n-element language model; a social relationship automatic determination model training unit 630, which uses the chat history after the feature extraction and the marked social relationship as training data to train, based on a classification algorithm, the social relationship automatic determination model, wherein the social relationship automatic determination model includes a chat history element and a social relationship element.

Figure 7:
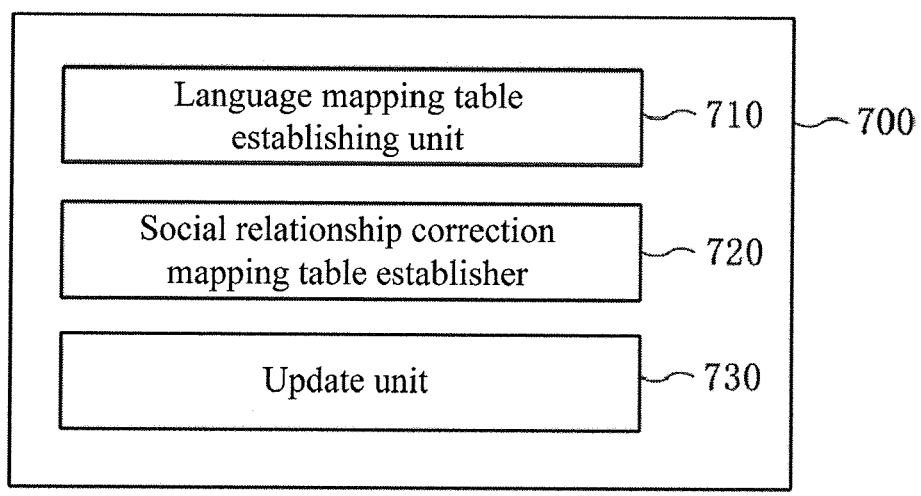
FIG. 7 shows the block diagram of a social relationship correction mapping table establishing unit according to an embodiment.

FIG. 7 shows a block diagram of a social relationship correction mapping table establishing unit 700 according to an embodiment.

Referring to FIG. 7, the social relationship correction mapping table establishing unit 700 comprises: a language mapping table establishing unit 710, which establishes a language mapping table through manual construction and/or an automatic mining algorithm, wherein the language mapping table is a mapping table for everyday casual language forms, self-effacing language forms, and respect language forms for respective words; a social relationship correction mapping table establisher 720, which establishes a social relationship correction mapping table, based on the established language mapping table and the established social relationship automatic determination model established by the social relationship automatic determination model establishing unit 600, wherein the social relationship correction mapping table includes a social relationship element, a user input element, and a correction candidate word element. In an embodiment, the social relationship correction mapping table establishing unit 700 may also include an update unit 730 to update the social relationship correction mapping table based on a user's selection of candidate words.

The devices and methods according to the aforementioned embodiments may be implemented as computer programs or computer readable codes. The computer programs or computer readable codes may be recorded on computer-readable recording media. The computer readable recording media may be any data storage devices that can store data that can be thereafter read by a computer system. Examples of the computer readable recording media include: read-only memories (ROM), random access memories (RAM), CD-ROM, magnetic tapes, floppy disks, optical data storage devices, and carrier waves (e.g., data transmission through the Internet). The computer-readable recording media can also be distributed over network coupled computer systems so that the computer readable codes are stored and executed in a distributed fashion.

The methods and devices for providing candidate words based on a social relationship during input may determine the social relationship between the user and the communication history based on the chat history of the two, and thus provide candidate words that suit the social relationship, which assists the user to correct improper wording and thus makes the communication smoother.

Although the present disclosure has been shown and described in details with references to example embodiments, one of ordinary skills in the art understands, various changes can be made to their forms and details without departing from the spirit and scope of the present disclosure.

What is claimed is:

1. A method for providing candidate words based on social relationship during input, comprising steps of:
   detecting user input;
   determining whether the current application environment is an information exchange application if user input is detected;
   determining an identifier of the communication counterpart in communication with the user if it is determined that the current application environment is an information exchange application;
   determining, based on the determined identifier of the communication counterpart, a social relationship between the user and the communication counterpart according to a social relationship automatic determination model, which is a model for determining a social relationship between the user and the communication counterpart;
   determining, based on a social relationship correction mapping table, whether the user input matches the determined social relationship, wherein the social relationship correction mapping table provides, based on the determined social relationship, correction candidate words corresponding to the social relationship;
   providing, based on the social relationship correction mapping table, correction candidate words that match the determined social relationship if it is determined that the user input does not match the social relationship;
   the method further comprises a step of establishing, in advance, a social relationship automatic determination model, wherein the step of establishing a social relationship automatic determination model comprises:
   marking the social relationship between the user and the communication counterpart, based on the chat history between the user and the communication counterpart stored in the information exchange application;
   carrying out a feature extraction on the chat history with an n-element language model;
   using the chat history after the feature extraction and the marked social relationship as training data to train, based on a classification algorithm, the social relationship automatic determination model,
   wherein the social relationship automatic determination model includes a chat history element and a social relationship element.

2. The method according to claim 1, wherein the step of determining whether the current application environment is an information exchange application includes: determining whether the current application environment is an information exchange application through calling determined parameters of the current application environment.

3. The method according to claim 1, wherein the step of determining an identifier of the communication counterpart in communication with the user includes:
   determining the identifier of the communication counterpart by extracting, in the information exchange application, information associated with the identifier of the communication counterpart.

4. The method according to claim 1, further comprising a step of establishing, in advance, a social relationship correction mapping table, wherein the step of establishing a social relationship correction mapping table comprises:
   establishing a language mapping table through manual construction and/or an automatic mining algorithm, wherein the language mapping table is a mapping table for everyday casual language forms, self-effacing language forms, and respect language forms for respective words;
   establishing a social relationship correction mapping table, based on the established language mapping table and the established social relationship automatic determination model,
   wherein the social relationship correction mapping table includes a social relationship element, a user input element, and a correction candidate word element.

5. The method according to claim 4, wherein the automatic mining algorithm is a word alignment model algorithm of an expectation-maximization algorithm.

6. The method according to claim 4, wherein the step of establishing, in advance, a social relationship correction mapping table further comprises:
   updating the social relationship correction mapping table based on a user's selection of provided candidate words.

7. The method according to claim 1, wherein the social relationship includes: same-generation/level relationship, different-generation relationship, leader-member relationship, and business relationship.

8. The method according to claim 1, wherein the forms of the candidate words associated with the social relationship include self-effacing language forms, respect language forms, and everyday casual language forms.

9. A method as claimed in claim 1, wherein the information exchange application includes at least one of a real-time communication service, a social network based chat/message service, and a short message service.

10. A device for providing candidate words based on social relationship during input, comprising:
    a memory for storing instructions; and
    a processor for executing the instructions, wherein the instructions comprise:
      an input detection instruction, which detects user input;
      a first determining instruction, which determines whether the current application environment is an information exchange application;
      a second determining instruction, wherein, when the first determining instruction determines that the current application environment is an information exchange application, the second determining instruction determines an identifier of the communication counterpart in communication with the user;
      a social relationship determination instruction, which, based on the determined identifier of the communication counterpart, determines a social relationship between the user and the communication counterpart according to a social relationship automatic determination model, wherein the social relationship automatic determination model is a model for determining a social relationship between the user and the communication counterpart;
      a matching determination instruction, which, based on a social relationship correction mapping table, determines whether the user input matches the determined social relationship, wherein the social relationship correction mapping table provides, based on the social relationship, correction candidate words corresponding to the established social relationship;
      a correction candidate word providing instruction, wherein, when the user input does not match the social relationship, the correction candidate word providing instruction provides, based on the social relationship correction mapping table, correction candidate words that match the determined social relationship;

the device further comprises a social relationship automatic determination model establishing instruction, wherein the social relationship automatic determination model establishing instruction comprises:

a social relationship marking instruction, which marks the social relationship between the user and the communication counterpart, based on the chat history between the user and the communication counterpart stored in the information exchange application;

a feature extraction instruction, which carries out feature extraction on the chat history with a n-element language model; and and a social relationship automatic determination model training instruction, which uses the chat history after the feature extraction and the marked social relationship as training data to train, based on a classification algorithm, the social relationship automatic determination model, wherein the social relationship automatic determination model includes a chat history element and a social relationship element.

11. The device according to claim 10, wherein the first determining instruction is configured to determine whether the current application environment is an information exchange application through calling determined parameters of the current application environment.

12. The device according to claim 10, wherein the second determining instruction is configured to determine the identifier of the communication counterpart by extracting, in the information exchange application, information associated with the identifier of the communication counterpart.

13. The device according to claim 10, the instructions further comprising a social relationship correction mapping table establishing instruction, wherein the social relationship correction mapping table establishing instruction comprises:

a language mapping table establishing instruction, which establishes a language mapping table through manual construction and/or an automatic mining algorithm, wherein the language mapping table is a mapping table for everyday casual language forms, self-effacing language forms, and respect language forms for respective words;

a social relationship correction mapping table establisher, which establishes a social relationship correction mapping table, based on the established language mapping table and the established social relationship automatic determination model, wherein the social relationship correction mapping table includes a social relationship element, a user input element, and a correction candidate word element.

14. The device according to claim 13, wherein the automatic mining algorithm is a word alignment model algorithm of an expectation-maximization algorithm.

15. The device according to claim 13, wherein, the social relationship correction mapping table establishing instruction further comprises: an update instruction to update the social relationship correction mapping table based on a user's selection of provided candidate words.

16. The device according to claim 10, wherein the social relationship includes at least one of: a same-generation/level relationship, a different-generation relationship, a leader-member relationship, and a business relationship.

17. The device according to claim 10, wherein the forms of the candidate words associated with the social relationship include self-effacing language forms, respect language forms, and everyday casual language forms.

18. The device according to claim 10, wherein the information change application includes real-time communication service, social network based chat/message service, and short message service.

* * * * *